(12) United States Patent
Falomi et al.

(10) Patent No.: US 10,087,987 B2
(45) Date of Patent: Oct. 2, 2018

(54) ROTATING MACHINE WITH AT LEAST ONE ACTIVE MAGNETIC BEARING AND SPACED AUXILIARY ROLLING BEARINGS

(71) Applicant: Nuovo Pignone Srl, Florence (IT)

(72) Inventors: Stefano Falomi, Florence (IT); Manuele Bigi, Florence (IT); Duccio Fioravanti, Florence (IT); Luciano Mei, Florence (IT)

(73) Assignee: Nuovo Pignone Srl, Florence (IT)

( * ) Notice: Subject to any disclaimer, the term of this patent is extended or adjusted under 35 U.S.C. 154(b) by 336 days.

(21) Appl. No.: 14/894,563

(22) PCT Filed: May 28, 2014

(86) PCT No.: PCT/EP2014/061059
§ 371 (c)(1),
(2) Date: Nov. 30, 2015

(87) PCT Pub. No.: WO2014/191459
PCT Pub. Date: Dec. 4, 2014

(65) Prior Publication Data
US 2016/0123388 A1 May 5, 2016

(30) Foreign Application Priority Data
May 30, 2013 (EP) .................................. 13169904

(51) Int. Cl.
*F16C 32/04* (2006.01)
*F04D 29/058* (2006.01)
(Continued)

(52) U.S. Cl.
CPC ........ *F16C 32/0442* (2013.01); *F04D 29/058* (2013.01); *F04D 29/059* (2013.01);
(Continued)

(58) Field of Classification Search
CPC .. F16C 32/0442; F16C 19/183; F16C 19/541; F16C 35/077; F04D 29/058; F04D 29/059
See application file for complete search history.

(56) References Cited

U.S. PATENT DOCUMENTS 4,629,261 A * 12/1986 Eiermann ........... F16C 32/0442
251/30.01
4,892,423 A * 1/1990 Takahashi ................ F16C 19/54
384/611
(Continued)

FOREIGN PATENT DOCUMENTS

| CN | 102022432 A | 4/2011 |
|---|---|---|
| SU | 1411526 A1 | 7/1988 |

OTHER PUBLICATIONS

International Search Report and Written Opinion issued in connection with corresponding application PCT/EP2014/061059 dated Oct. 17, 2014.
(Continued)

*Primary Examiner* — Robert W Horn
(74) *Attorney, Agent, or Firm* — GE Global Patent Operation

(57) ABSTRACT

A rotating machine comprises a shaft, a casing, at least one main magnetic bearing connected to the shaft for rotatably supporting said shaft inside the casing, at least one first and one second auxiliary rolling bearings positioned between the shaft and the casing to support axial and radial loads, and first and second axial abutment means positioned on the shaft to transmit axial loads to inner rings of the rolling bearings. The machine further comprises a spacer axially positioned between facing faces of the inner rings of said rolling bearings for the transmission of the axial loads between said inner rings, and at least a first axial retaining means positioned on the casing and located axially between (Continued)

Figure 1:
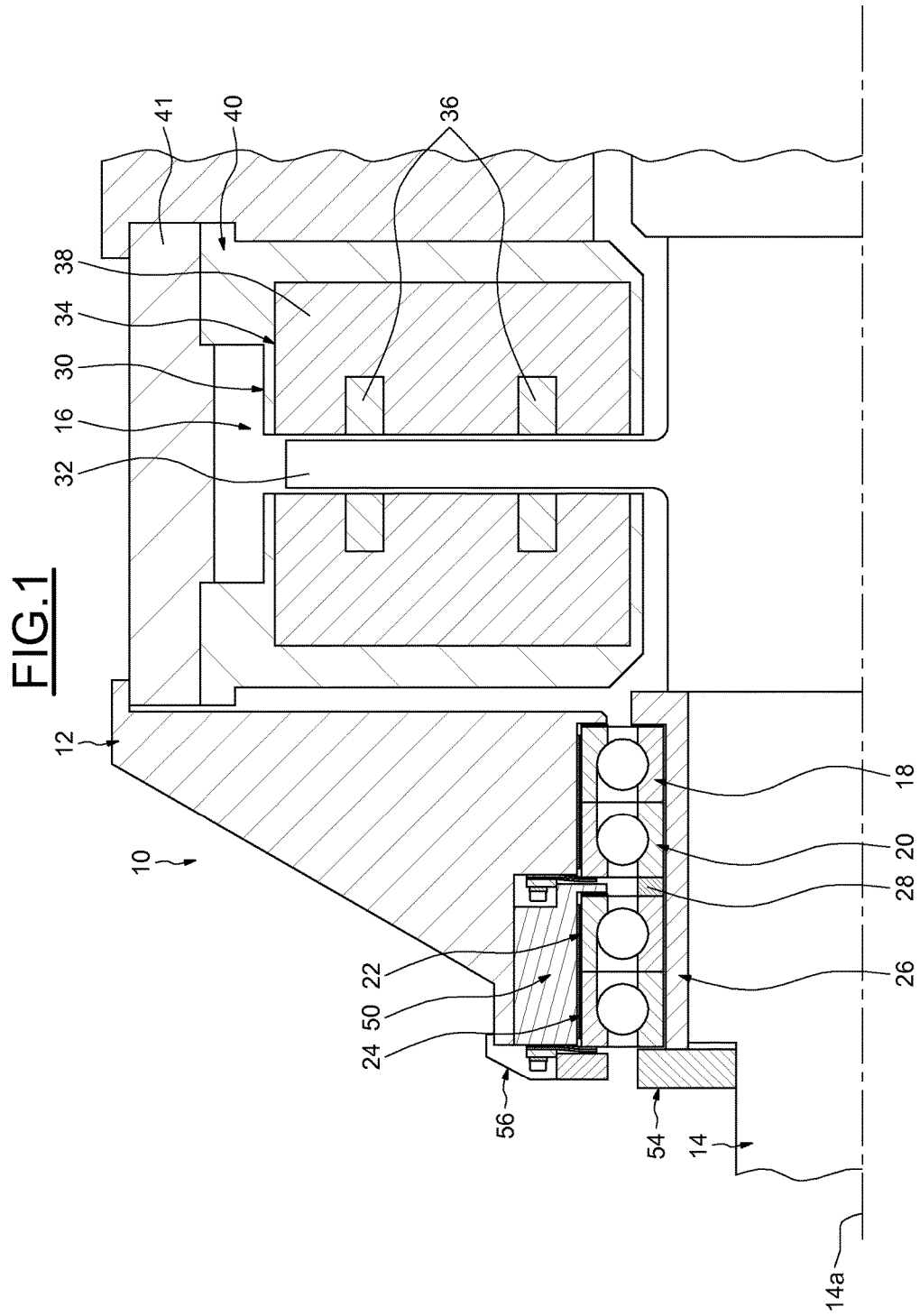

facing faces of the outer rings for the transmission of the axial loads between at least one of said outer rings and the casing.

20 Claims, 2 Drawing Sheets

(51) Int. Cl.
    *F04D 29/059*     (2006.01)
    *F16C 35/06*     (2006.01)
    *F16C 35/077*     (2006.01)
    *F16C 19/18*     (2006.01)
    *F16C 25/08*     (2006.01)
    *F16C 27/04*     (2006.01)
    *F16C 39/02*     (2006.01)
    *F16C 19/54*     (2006.01)
    *F16C 19/16*     (2006.01)

(52) U.S. Cl.
    CPC .......... *F16C 19/183* (2013.01); *F16C 19/541* (2013.01); *F16C 25/083* (2013.01); *F16C 27/04* (2013.01); *F16C 35/061* (2013.01); *F16C 35/077* (2013.01); *F16C 39/02* (2013.01); *F16C 19/163* (2013.01); *F16C 2360/44* (2013.01)

(56) References Cited

U.S. PATENT DOCUMENTS

| | | | | |
|---|---|---|---|---|
| 5,231,323 | A * | 7/1993 | New | F16C 27/066 |
| | | | | 310/90 |
| 6,661,143 | B1 * | 12/2003 | Ohura | F04D 19/048 |
| | | | | 310/90 |
| 7,217,039 | B2 * | 5/2007 | Baudelocque | C12N 9/93 |
| | | | | 310/90.5 |
| 9,024,494 | B2 * | 5/2015 | Hawkins | H02K 7/09 |
| | | | | 310/90 |
| 9,309,922 | B2 * | 4/2016 | Delepine | F16C 39/02 |
| 2004/0189124 | A1 * | 9/2004 | Baudelocque | C12N 9/93 |
| | | | | 310/90.5 |
| 2011/0069916 | A1 | 3/2011 | Palomba et al. | |
| 2011/0085753 | A1 * | 4/2011 | Tecza | F16C 27/066 |
| | | | | 384/462 |
| 2016/0102705 | A1 * | 4/2016 | Mei | F04D 29/051 |
| | | | | 310/90.5 |
| 2016/0123388 | A1 * | 5/2016 | Falomi | F16C 35/061 |
| | | | | 310/90.5 |

OTHER PUBLICATIONS

Office Action and Search issued in connection with corresponding RU Application No. 2015148744 dated Jan. 30, 2018.

Unofficial English Translation of Chinese Office Action issued in connection with corresponding CN Application No. 201480031279.8 dated Jan. 4, 2017.

* cited by examiner

ROTATING MACHINE WITH AT LEAST ONE ACTIVE MAGNETIC BEARING AND SPACED AUXILIARY ROLLING BEARINGS

BACKGROUND

The embodiments disclosed relate generally to rotating machines with at least a main active magnetic bearing and auxiliary rolling bearings. In particular, the embodiments relate to rotating turbomachines such as compressors, expanders, turbines, pumps, etc. The turbomachines are used in engines, turbines, power generation, cryogenic applications, oil and gas, petrochemical applications, etc.

One turbomachine often used in the industry includes a centrifugal compressor which increases the pressure of a compressible gas through the use of mechanical energy by rotating centrifugal impellers through which the gas passes. The impellers are attached to a compressor shaft. The rotating shaft and the associated impellers form a rotor assembly which is supported in the stator of the compressor by active radial and axial magnetic bearings.

The active magnetic bearings levitate and maintain the rotor assembly in position inside the stator by applying electromagnetic forces on the assembly in axial and radial directions. To this end, the active magnetic bearings comprise electromagnets supplied with electrical energy. With such magnetic bearings, the rotor assembly is held with no mechanical contact. Such a holding necessitates supplying the electromagnets with sufficient electrical power.

Failure or insufficient normal operation of the active magnetic bearings may sometimes occur with an interruption of the electrical power supply. Failure may also occur in the event of excessive loads applied on the rotor assembly.

In these cases, the active magnetic bearings no longer center the rotor assembly inside the stator. Accordingly, there appears a "landing" phase during which the rotor assembly tends to come into contact with the stator and is held with mechanical contact.

To overcome this drawback, the centrifugal compressor further comprises two single row angular contact ball bearings mounted face-to-face on the compressor shaft axially next to the active magnetic bearings. Each auxiliary rolling bearing is provided to support both radial and axial loads when a "landing" phase appears.

However, with such ball bearings, the number of landing phases which can be sustained without any inadmissible changes in clearance dimensions of the bearings is limited. This leads to a reduction of the reliability of the rotating machine and to an increase of the maintenance operations. Besides, for a rotating machine with limited accessibility, costs of such maintenance operations can be extremely high.

An aim of embodiments of the present invention is to overcome these drawbacks.

SUMMARY OF THE INVENTION

It is an object of embodiments of the present invention to provide a rotating machine having auxiliary rolling bearings with increased service life in order to allow a greater number of landing phases.

It is another object of embodiments of the present invention to provide a rotating machine with low maintenance costs due to such landing phases.

In an embodiment, the rotating machine comprises a shaft, a casing, at least one main magnetic bearing connected to the shaft for rotatably supporting the shaft inside the casing, and at least one first and one second auxiliary rolling bearings positioned between the shaft and the casing to support axial and radial loads, the auxiliary rolling bearings each being provided with an inner ring, with an outer ring and with at least one row of rolling elements positioned between the rings. The rotating machine further comprises first and second axial abutment means positioned on the shaft to transmit axial loads to the inner rings of the first and second rolling bearings, a spacer axially positioned between facing faces of the inner rings of the rolling bearings and mounted in axial contact with the faces for the transmission of the axial loads between the inner rings, and at least a first axial retaining means positioned on the casing and located axially between facing faces of the outer rings of the first and second rolling bearings for the transmission of the axial loads between at least one of the outer rings and the casing.

Thanks to the interposition of the spacer and of the first axial retaining means between the first and the second rolling bearings, the axial loads applied by the abutment means are shared by each pair of rolling bearings. Accordingly, the service life of each rolling bearing is strongly increased. The number landing phase which can be sustained by the auxiliary rolling bearings is also increased.

Each abutment means may axially face one of the inner rings on the side opposite to the spacer.

In some embodiments, the shaft comprises at least one sleeve radially interposed between an outer surface of the shaft and the inner rings of the first and second rolling bearings. In an embodiment, the sleeve may comprise one of the first and second axial abutment means.

In one embodiment, the casing comprises an intermediate housing radially interposed between a bore of the casing and the outer ring of one of the first and second rolling bearings. The intermediate housing may comprise the first axial retaining means.

In an embodiment, the rotating machine may further comprise second and third axial retaining means positioned on the casing to axially maintain the outer rings of the first and second rolling bearings, each of the second and third axial retaining means being located axially on the side opposite to the first axial retaining means with regard to associated rolling bearing.

In one embodiment, the rotating machine comprises at least one pre-stressing and damping element exerting an axial force on each of the first and second rolling bearings.

The service life of each bearing is also increased with the use of at least one axial pre-stressing and damping element which can decrease the dynamic axial landing loads effects.

In some embodiments, the rotating machine may comprise one pre-stressing and damping element axially positioned between the second axial retaining means of the casing and the outer ring of the associated rolling bearing. One pre-stressing and damping element may be axially positioned between the third axial retaining means of the casing and the outer ring of the associated rolling bearing. The rotating machine may comprise one pre-stressing and damping element axially positioned between the first axial retaining means of the casing and the outer ring of each associated rolling bearing. The pre-stressing and damping elements may comprise an elastic plate spring or a conical washer.

In some embodiments, the rotating machine comprises two first rolling bearings axially in contact one to another, and two second rolling bearings axially in contact one to another. In an embodiment, the first and second rolling bearings may be identical to one another. In one embodiment, the first and second rolling bearing are positioned axially next to the main magnetic bearing. The first and second rolling bearings may be angular contact thrust ball bearings.

DETAILED DESCRIPTION OF THE DRAWINGS

Figure 2:
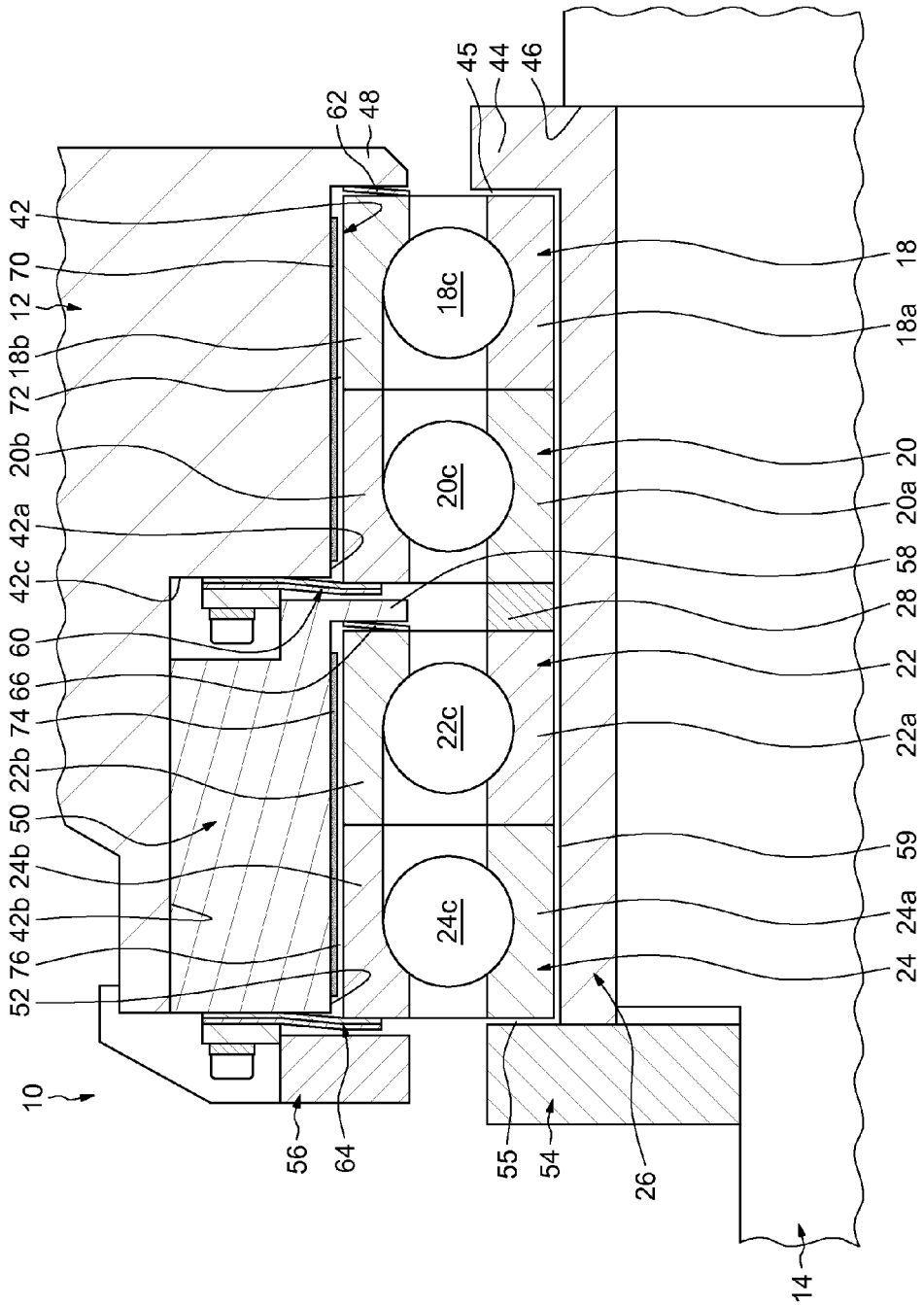

Other characteristics used will appear on reading the following detailed description of a particular embodiment of the invention given by way of non-limiting example and illustrated by the accompanying drawings in which:

FIG. 1 is a partial axial section of a rotating machine according to an embodiment, FIG. 2 is part section on a larger scale of FIG. 1.

DETAILED DESCRIPTION

The following detailed description of the embodiments refer to the accompanying drawings. The same reference numbers in different drawings identify the same elements.

FIG. 1 partially illustrates an embodiment of a rotating machine 10 of the invention. The rotating machine 10 comprises a casing 12, a rotating shaft 14 extending along an axis 14a and adapted to support a rotor part (not shown). For example, if the rotating machine is a centrifugal compressor, the rotor part comprises impellers. The rotating shaft and the associated rotor part form a rotor assembly.

The rotating machine 10 also comprises at least one main active magnetic bearing 16 connected to the shaft 14 and supporting the shaft inside the casing 12, and auxiliary rolling bearings 18 to 24 associated to the magnetic bearing 16 and radially mounted between the shaft 14 and the casing 12 to support and transmit radial and axial loads therebetween when the magnetic bearing 16 is not operating normally. The rotating machine 10 further comprises an annular sleeve 26 radially positioned between the auxiliary rolling bearings 18 to 24 and the shaft 14, and an annular spacer 28 axially interposed between the rolling bearings 18, 20 and the other rolling bearings 22, 24. The auxiliary rolling bearings 18 to 24 are positioned axially next to the magnetic bearing 16 on the same side of the bearing. The auxiliary rolling bearings 18 to 24 are fixed to the casing 12 and radially surround the sleeve 28 of the shaft. The rolling bearings 18, 20 are axially spaced apart from the rolling bearings 22, 24.

The main magnetic bearing 16 may be provided at one end of the casing 12. The magnetic bearing 16 is of the axial type. A main radial type magnetic bearing (not shown) may also be associated to the axial magnetic bearing 16 to support the rotating shaft 14. The active magnetic bearing 16 comprises a stator armature 30 fixed to the casing 12 and a rotor armature 32 in the form of a disk secured to the rotating shaft 14. The stator armature 30 comprises a stator magnetic circuit 34 including, in conventional manner, annular coils 36 and a ferromagnetic body 38 which may be massive or laminated locally. The stator armature 30 also comprises a protective annular support 40 into which is placed the magnetic circuit 34. The support 40 is secured to a stationary support element 41 that is itself fixed to the casing 12. The stator magnetic circuit 34 is placed axially facing the rotor armature 32 with no mechanical contact.

In normal operation, i.e. with the magnetic bearing(s) operating normally and with no excessive loads on the shaft 14, the bearing(s) holds the rotor assembly centered in the casing 12. When the magnetic bearing(s) is (are) not operating normally, the rolling bearings 18 to 24 limit radial and axial movements of the shaft 14 inside the casing 12 and support and transmit axial and radial loads therebetween. As will be detailed, the arrangement of the rolling bearings 18 to 24 is adapted to increase their service life.

In the disclosed embodiment, the rolling bearings 18 to 24 are angular contact thrust rolling bearings. The rolling bearings 18 to 24 are arranged in pairs and face-to-face in order that each rolling bearings pair can accommodate axial loads acting in both directions. For each pair, the two rolling bearings are axially in contact one to another. Since the rolling bearings 18 to 24 are identical, only one of them will be described here, it being understood that the identical elements of the other rolling bearing have the same reference.

As shown more clearly on FIG. 2, the rolling bearing 18 comprises an inner ring 18a, an outer ring 18b and a plurality of rolling elements 18c, which in this case are balls, radially interposed between the rings. The axis of the rolling bearing 18 is coaxial with the axis of the shaft. The inner ring 18a comprises a cylindrical bore mounted around an outer cylindrical surface of the sleeve 26, an outer cylindrical surface, two opposite radial faces delimiting axially the bore and the outer surface, and a toroidal circular raceway formed onto the outer surface for the rolling elements 18c, the the raceway being directed radially outwards. The outer ring 18b comprises an outer cylindrical surface mounted into an axial bore 42 of the casing, a first cylindrical bore of small diameter, a second cylindrical bore of larger diameter and a circular raceway for the rolling elements 18c connected to the bores in order that the rolling bearing 18 can accommodate axial loads only in one direction. The outer ring 18b also comprises two opposite radial faces delimiting axially the outer surface and the bores.

As above-mentioned, the two rolling bearings 18, 20 are mounted axially in contact one to another. The radial faces of the inner and outer rings 18a, 18b of the rolling bearing 18 which are oriented axially towards the other rolling bearing 20 axially bear against the corresponding radial faces of the inner and outer rings 20a, 20b of the bearing. The opposite radial face of the inner ring 18a axially faces a radial annular rib 44 formed at an axial end of the sleeve 26, the rib being in axial contact against a radial shoulder 46 formed on the shaft. The rib 44 forms an abutment means for the inner ring 18a. An axial clearance 45 is provided between the rib 44 and the inner ring 18a. The radial face of the inner ring 20a which is located axially on the side opposite to the rolling bearing 18, i.e. oriented axially outwards, axially abuts against the spacer 28.

Axially on the side opposite to the rolling bearing 20, the radial face of the outer ring 18b axially faces a radial protrusion 48 formed on the bore 42 of the casing and extending radially inwards. The bore 42 has a stepped form and comprises a small-diameter axial surface 42a, a large-diameter axial surface 42b and a radial surface 42c provided between the axial surfaces. The outer rings 18b, 20b of the rolling bearings are mounted into the small-diameter axial surface 42a of the bore. The protrusion 48 is formed at an axial end of the axial surfaces 42a. The rolling bearing 20 slightly axially protrudes with regard to the radial surface 42c of the bore.

The rotating machine 10 further comprises an intermediate housing 50 mounted radially into contact with the large-diameter axial surface 42b of the bore. The housing 50 is secured to the casing 12 for instance with bolts. The housing comprises an axial bore 52 into which are mounted the outer rings of rolling bearings 22, 24. The rolling bearing 24 slightly axially protrudes outwards with regard to the bore 52.

As above-mentioned, the two rolling bearings 22, 24 are mounted axially in contact one to another. The rolling bearings 22, 24 are arranged face-to-face in order to accommodate axial loads acting in both directions. The radial faces of the inner and outer rings 22a, 22b of the rolling bearing 22 which are oriented axially towards the other rolling bearing 24 axially bear against the corresponding radial faces of the inner and outer rings 24a, 24b of the bearing. The opposite radial face of the inner ring 22a axially bears against the spacer 28. The spacer 28 is in axial contact against the rolling bearing 22 on one side and in axial contact with the rolling bearing 20 on the other side. In the disclosed embodiment, the radial dimension of the spacer 28 is equal to the one of the inner rings 20a, 22a.

The rotating machine 10 further comprises an abutting ring 54 secured on the shaft 14. The abutting ring 54 axially faces the radial face of the inner ring 24a which is located axially on the side opposite to the rolling bearing 22, i.e. oriented axially outwards. The abutting ring 54 axially bears against the sleeve 26. An axial clearance 55 is provided between the abutting ring 54 and the inner ring 24a. The rotating machine 10 also comprises a retaining ring 56 is secured on the casing 12, for instance with bolts, and radially surrounds the abutting ring 54. The retaining ring 56 axially faces the radial face of the outer ring 24b oriented axially outwards. The radial face of the outer ring 22b oriented axially inwards faces a radial protrusion 58 formed on the bore 52 of the housing and extending radially inwards. The outer rings of the rolling bearings 22, 24 are axially maintained in position into the bore 52 by stopping or retaining means positioned on the casing 12, i.e. the protrusion 58 and the retaining ring 56. The outer rings of the rolling bearings 18, 20 are axially maintained in position into the bore 42 of the casing by the protrusions 48, 58.

The rolling bearings 18 to 24 are radially positioned around the sleeve 26 which is mounted on the outer surface of the shaft 14. A radial clearance 59 is provided between the bore of the inner rings of the rolling bearings and of the spacer 28 and the outer surface of the sleeve 26. The sleeve 26 axially bears at one end against the radial shoulder 46 formed on the shaft and, at the opposite axial end, against the abutting ring 54.

The rotating machine 10 further comprises elastic springs 60, 62, 64 and 66 provided to axially preload the rolling bearings 18, 20 and 22, 24. The elastic spring 60 is fixed on the radial surface 42c of the casing 12 and acts on the radial face of the outer ring 20b of the rolling bearing which is oriented axially outwards, i.e. located axially on the side opposite to the other rolling bearing 18. The elastic spring 60 is in axial contact against the rolling bearing 20 on one side and an axial gap is provided with the protrusion 58 of the intermediate housing 50 on the other side. The elastic spring 60 exerts a permanent axial force on the rolling bearing 20. The elastic spring 60 also tends, via the rolling bearing 20, to axially push and preload the other rolling bearing 18 towards the protrusion 48. The load applied by the elastic spring 60 therefore axially pre-stresses both the rolling bearings 18, 20 towards the protrusion 48. In the disclosed embodiment, the axial elastic spring 60 comprises two superposed metal elastic plate springs.

The elastic spring 62 is axially positioned between the protrusion 48 of the casing and the radial face of the outer ring 18b of the rolling bearing. The elastic spring 62 is in axial contact against the rolling bearing 18 on one side and in axial contact with the protrusion 48 on the other side. The elastic spring 62 exerts a permanent axial force on the rolling bearing 18 along a direction opposite to the axial force exerted by the elastic spring 60. The elastic springs 60, 62 both axially preload the two rolling bearings 18, 20. Here, the radial dimension of the elastic spring 62 is substantially equal to the radial dimension of the outer ring 18b and of the protrusion 48. In the disclosed embodiment, the axial elastic spring 62 is a metal elastic washer, for example of the Belleville washer type.

The elastic spring 64 is fixed on the intermediate housing 50 and acts on the radial face of the outer ring 24b of the rolling bearing which is oriented axially outwards, i.e. located axially on the side opposite to the other rolling bearing 22. The elastic spring 64 is in axial contact against the rolling bearing 24 on one side and an axial gap is provided with the retaining ring 56 on the other side. The elastic spring 64 exerts a permanent axial force on the rolling bearing 24. The elastic spring 64 also tends, via the rolling bearing 24, to axially push and preload the other rolling bearing 22 towards the protrusion 58 of the intermediate housing. The load applied by the elastic spring 64 therefore axially pre-stresses both the rolling bearings 22, 24 towards protrusion 58. In the disclosed embodiment, the axial elastic spring 64 comprises two superposed metal elastic plate springs.

The elastic spring 66 is axially positioned between the protrusion 58 of the intermediate housing and the radial face of the outer ring 22b of the rolling bearing. The elastic spring 66 is in axial contact against the rolling bearing 22 on one side and in axial contact with the protrusion 58 on the other side. The elastic spring 66 exerts a permanent axial force on the rolling bearing 22 along a direction opposite to the axial force exerted by the elastic spring 64. The elastic springs 64, 66 both axially preload the two rolling bearings 22, 24. Here, the radial dimension of the elastic spring 66 is substantially equal to the radial dimension of the outer ring 22b and of the protrusion 58. In the disclosed embodiment, the axial elastic spring 66 is a metal elastic washer, for example of the Belleville washer type.

The rotating machine further comprises an annular damping sleeve 70 mounted radially into contact with the axial surface 42a of the bore of the casing and radially surrounding the outer rings 18b, 20b of the rolling bearings. The damping sleeve 70 may be a corrugated laminate. A radial clearance 72 is provided between the damping sleeve 70 and the outer surface of the outer rings 18b, 20b. A similar arrangement is also provided between the rolling bearings 22, 24 and the housing 50. As a matter of fact, the rotating machine also comprises an annular damping sleeve 74 mounted radially into contact with the bore 52 of the housing and radially surrounding the outer rings 22b, 24b of the rolling bearings. A radial clearance 76 is provided between the damping sleeve 74 and the outer surface of the outer rings 22b, 24b. The damping sleeve 74 may be a corrugated laminate.

In normal operation, the active magnetic bearing(s) hold(s) the shaft 14 centered in the casing 12 and there is no contact between the inner rings of the rolling bearings 18 to 24, the sleeve 26 and the abutting ring 54. The elastic springs 60 to 64 which axially preload the rolling bearings 18 to 24 prevent the bearings from unexpected rotation.

In the event of a landing phase, the shaft 14 can move both axially and radially inside the casing 12. The shaft 14 can move radially by virtue of the radial clearance 59 provided between the sleeve 26 and the inner rings of the rolling bearings 18 to 24 until the sleeve comes radially in contact with the rings. This leads to a rotation of the inner rings 18a, 20a of the bearings. The radial dynamic landing loads are supported by the rolling bearings 18 to 24. The shaft 14 can move axially by virtue of the axial clearances 45, 55 provided between the sleeve 26, the abutting ring 54 and the inner rings of the rolling bearings 18, 24.

In case of an axial displacement of the shaft 14 during a landing phase so that the rotor armature 32 of the magnetic bearing moves axially towards the rolling bearings 18 to 24, the rib 44 of the sleeve axially abuts against the inner ring 18*a* of the rolling bearing. The axial dynamic landing loads applied by the rib 44 on the inner ring 18*a* are transmitted to the inner ring 20*a* of the associated rolling bearing. A part of the applied axial loads is transmitted from the inner ring 20*a* to the outer ring 20*b* of the rolling bearing through the rolling elements 20*c* and then to the spring 60 and to the casing 12. Another part of the applied axial loads is transmitted from the inner ring 20*a* to the axial spacer 28 and then to the inner rings 22*a*, 24*a* of the two other rolling bearings 22, 24 axially in contact. From the inner ring 24*a*, the part of the applied axial loads is transmitted to the outer ring 24*b* of the rolling bearing through the rolling elements 24*c* and then to the spring 64, to the intermediate housing 50 and to the casing 12. In case of high axial loads, the radial protrusion 58 forms an abutment means to limit the axial deformation of the outer ring 20*b* of the rolling bearing and the retaining ring 56 also forms an abutment means to limit the axial deformation of the outer ring 24*b* of the rolling bearing.

During a loading phase, in case of an axial displacement of the shaft 14 in the opposite direction, the abutting ring 54 axially abuts against the inner ring 24*a* of the rolling bearing. The axial dynamic landing loads applied by the abutting ring 54 on the inner ring 24*a* are transmitted to the inner ring 22*a* of the associated rolling bearing. A part of the applied axial loads is transmitted from the inner ring 22*a* to the outer ring 22*b* of the rolling bearing through the rolling elements 24*c*, and then to the radial protrusion 58 of the intermediate housing 50 and to the casing 12. Another part of the applied axial loads is transmitted from the inner ring 22*a* to the spacer 28 and then to the inner rings 20*a*, 18*a* of the two other rolling bearings 18, 20 axially in contact. From the inner ring 18*a*, the part of the applied axial loads is transmitted to the outer ring 24*b* of the rolling bearing and then to the casing 12.

In the event of a landing phase, thanks to the interposition of the spacer 28 and of the rib 58 between one pair of rolling bearings 18, 20 and the other pair of rolling bearings 22, 24, the axial loads applied either by the rib 44 or the abutting ring 54 are shared by each pair of rolling bearings. Accordingly, the service life of each rolling bearing is strongly increased. The number landing phase which can be sustained by the auxiliary rolling bearings 18 to 24 is also increased.

There are two paths for the axial landing loads: a part of the loads is carried only by one pair of rolling bearings and then transmitted to the casing 12, and the other part is carried by the two pairs of rolling bearings and then transmitted to the casing. Since the two pairs of rolling bearings are identical one to another, the stiffness levels of the pairs are the same and the axial loads are equally distributed therebetween. Accordingly, the service life of each rolling bearing is also extended. Otherwise, the elastic springs 60 to 66 are able to damper the axial landing loads. The elastic springs perform a dual function, namely to axially preload the rolling bearings 18 to 24 and additionally to damper the axial landing loads. When a landing phase appears, the shaft 14 passes from a state of being held with no contact to a state of being held by virtue of mechanical contacts with the rolling bearings 18 to 24.

In the disclosed embodiment, the rolling bearings 18 to 24 are angular contact thrust ball bearings. Alternatively, the rolling bearings may be for example deep groove ball bearings, four-point contact balls bearings, tapered roller bearings, spherical roller bearings, etc.

The above description is made with reference to a rotary machine comprising four rolling bearings having each a single row of rolling elements. However, it can be applied in like manner to a rotary machine comprising two rolling bearings axially spaced one to another by the axial spacer and having each one row of rolling elements or at least two rows of rolling elements.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A rotating machine comprising:
   a shaft;
   a casing;
   at least one main magnetic bearing connected to the shaft for rotatably supporting said shaft;
   a first auxiliary rolling bearings and a second auxiliary rolling bearing positioned axially spaced and radially between the shaft and the casing to support axial and radial loads, each of said first and second auxiliary rolling bearings including an inner ring, an outer ring and at least one row of rolling elements positioned between the respective inner ring and the outer ring; and
   a first axial abutment and a second axial abutment positioned on the shaft to transmit axial loads to the inner rings of the first and second auxiliary rolling bearings, wherein the first and second auxiliary rolling bearings are positioned between the first and second axial abutments;
   a spacer axially positioned between facing faces of the inner rings of said first and second auxiliary rolling bearings and mounted in axial contact with said faces for the transmission of the axial loads between said inner rings of the first and second auxiliary rolling bearings,
   a first axial retainer positioned on the casing and located axially between facing faces of the outer rings of the first and second auxiliary rolling bearings for the transmission of the axial loads between at least one of said outer rings of the first and second auxiliary rolling bearings and the casing; and
   a second axial retainer positioned on the casing and located axially at an axial end face of the outer ring of the first auxiliary rolling bearing for the transmission of the axial load between the outer ring of the first auxiliary bearing and the casing; and
   wherein the first axial retainer is spaced from the outer ring of the first auxiliary rolling bearing.
2. The rotating machine according to claim 1, wherein the first and second abutments axially faces one of the inner rings on the side opposite to the spacer.

3. The rotating machine according to claim 1, wherein the shaft comprises at least one sleeve radially interposed between an outer surface of said shaft and the inner rings of the first and second auxiliary rolling bearings.

4. The rotating machine according to claim 3, wherein the sleeve comprises one of the first and second axial abutments.

5. The rotating machine according to claim 1, wherein the casing comprises an intermediate housing radially interposed between a bore of said casing and the outer ring of one of the first and second auxiliary rolling bearings.

6. The rotating machine according to claim 5, wherein the intermediate housing comprises the first axial retainer.

7. The rotating machine according to claim 1, further comprising a third axial retainer positioned on the casing to axially maintain the outer rings of the second auxiliary rolling bearing, the third axial retainer being located axially at an axial end face of the outer ring of the second auxiliary rolling bearing for the transmission of the axial load between the outer ring of the second auxiliary bearing and the casing.

8. The rotating machine according to claim 7, further comprising a first pre-stressing and damping element axially positioned between the first axial retainer and the outer ring of the first auxiliary rolling bearing.

9. The rotating machine according to claim 8, further comprising a second pre-stressing and damping element axially positioned between the third axial retainer and the outer ring of the second auxiliary rolling bearing.

10. The rotating machine according to claim 9, further comprising a third pre-stressing and damping element axially positioned between the first axial retainer and the outer ring of the second auxiliary rolling bearing; and a fourth pre-stressing and damping element axially positioned between the second axial retainer and the outer ring of the first auxiliary rolling bearing.

11. The rotating machine according to claim 10, wherein the first and second pre-stressing and damping element comprises an elastic plate spring; and the third and fourth pre-stressing and dampening element comprises a conical washer.

12. The rotating machine according to claim 1, wherein the first and second auxiliary rolling bearings are identical to one another.

13. The rotating machine according to claim 1, wherein the first and second auxiliary rolling bearings are positioned axially next to the main magnetic bearing.

14. The rotating machine according to claim 2, wherein the shaft comprises at least one sleeve radially interposed between an outer surface of said shaft and the inner rings of the first and second auxiliary rolling bearings.

15. The rotating machine according to claim 10, further comprising a first dampening sleeve radially positioned between the casing and the outer ring of of one of the first and second auxiliary rolling bearings.

16. The rotating machine according to claim 15, further comprising a second dampening sleeve positioned between the casing and the outer ring of the other one of the first and second auxiliary rolling bearings.

17. The rotating machine according to claim 15, wherein the first dampening sleeve is a corrugated laminate.

18. The rotating machine according to claim 17, wherein the second dampening sleeve is a corrugated laminate.

19. The rotating machine according to claim 9, further comprising a first and second dampening sleeve radially positioned respectively between the casing and the outer ring of a respective first and second auxiliary rolling bearings.

20. The rotating machine comprising:
a shaft;
a casing;
at least one main magnetic bearing connected to the shaft for rotatably supporting said shaft;
a first auxiliary rolling bearing and a second auxiliary rolling bearing positioned axially spaced and radially between the shaft and the casing to support axial and radial loads, each of said first and second auxiliary rolling bearings including an inner ring, an outer ring and at least one row of rolling elements positioned between the respective inner ring and outer ring; and
a first axial abutment and a second axial abutment positioned on the shaft to transmit axial loads to the inner rings of the first and second auxiliary rolling bearings, wherein the first and second auxiliary rolling bearings are positioned between the first and second axial abutments;
a spacer axially positioned between facing faces of the inner rings of said first and second auxiliary rolling bearings and mounted in axial contact with said faces for the transmission of the axial loads between said inner rings of the first and second auxiliary rolling bearings; and
a first axial retainer positioned on the casing and located axially between facing faces of the outer rings of the first and second auxiliary rolling bearings for the transmission of the axial loads between at least one of said outer rings of the first and second auxiliary rolling bearings and the casing; and
wherein the first auxiliary rolling bearings includes a pair of first auxiliary rolling bearings axially in contact to each other, and the second auxiliary rolling bearings includes a pair of second auxiliary rolling bearings axially axially in contact to each other.

* * * * *